(12) United States Patent
Bradford

(10) Patent No.: US 6,210,531 B1
(45) Date of Patent: Apr. 3, 2001

(54) FORMING MACHINES

(75) Inventor: Jonathan Herbert Bradford, Bolton (GB)

(73) Assignee: PX Technologies, Ltd., Worsbrough (GB)

(*) Notice: Subject to any disclaimer, the term of this patent is extended or adjusted under 35 U.S.C. 154(b) by 0 days.

(21) Appl. No.: 09/340,922

(22) Filed: Jun. 25, 1999

Related U.S. Application Data

(63) Continuation of application No. PCT/GB98/03200, filed on Oct. 26, 1998.

(51) Int. Cl.[7] .................................................. D21F 13/00
(52) U.S. Cl. ............................................. 162/218; 162/348
(58) Field of Search ..................................... 162/218, 348

(56) References Cited

U.S. PATENT DOCUMENTS 4,806,195  2/1989  Namysl .

FOREIGN PATENT DOCUMENTS

| | | |
|---|---|---|
| 3814318 | 11/1989 | (DE) . |
| 0 105 722 A1 | 4/1984 | (EP) . |
| 0 406 783 A2 | 1/1991 | (EP) . |
| 0 406 783 A3 | 1/1991 | (EP) . |
| 0 466 653 A1 | 1/1992 | (EP) . |
| 645687 | 11/1950 | (GB) . |
| 872135 | * 7/1961 | (GB) . |
| 972325 | 10/1964 | (GB) . |
| 1105449 | 3/1968 | (GB) . |
| 1121849 | 7/1968 | (GB) . |
| 1131323 | 10/1968 | (GB) . |
| 1577571 | 10/1980 | (GB) . |
| 63-130300 | 6/1988 | (JP) . |

OTHER PUBLICATIONS

UK Search Report; GB 9823221.8; Dated Jan. 26, 1999.
International Search Report; PCT/GB98/03200; Completed Mar. 19, 1999.

* cited by examiner

Primary Examiner—Stanley S. Silverman
Assistant Examiner—Mark Halpern
(74) Attorney, Agent, or Firm—Alston & Bird LLP

(57) ABSTRACT

A press station for a forming machine for forming articles from paper has a chamber consisting of two halves. The two halves of the chamber are able to be closed together and the chamber can be evacuated through a main vacuum manifold in order to bring the upper die mounted on a first platen into pressing contact with a fragile moulding positioned on a second platen in order to form the required article.

21 Claims, 3 Drawing Sheets

FORMING MACHINES

CROSS-REFERENCE TO RELATED APPLICATIONS

This application is a continuation of pending PCT International Application PCT/GB98/03200, filed Oct. 26, 1998, designating inter alia the United States.

FIELD OF THE INVENTION

This invention relates to forming machines more particularly for producing components from a paper pulp or slurry. Egg separators and egg boxes are typical examples of components of this kind, although the same forming process or a similar one is, or may be, used to form containers and other articles for a variety of purposes.

BACKGROUND OF THE INVENTION

A known forming machine for making such components requires a relatively massive surrounding frame to withstand the pressures applied during a press operation at a press station of the machine. The force required to press the paper pulp or slurry into the required shape at the press station may be in the order of 20 tons or so and is usually provided by hydraulics. Consequently, the frame needs to be extremely strong to continually withstand the very considerable forces involved and the cost of the massive frame tends to add very considerably to the overall costs. The cost of the frame will depend upon the size of the machine itself but, typically, may be in the order of £135,000 or so. There may be other disadvantages of the machine related to providing the required pressing force; such disadvantages may relate e.g. to the additional bulk of the machine (i.e. hydraulic ram) and/or to additional noise or inconvenience of operation or even undue inefficiency. Furthermore, the press station is normally pre-set to press the article being formed under a particular pressure to a particular thickness. Thus, it tends to be disadvantageous that, since the machine has been preset to operate at a particular pressure to press a particular article to a certain thickness, there is little control to vary the applied pressure and/or thickness of the article (without resetting press dies) more particularly in a controlled way to vary the quality and/or characteristics of the article in an accurately predictable manner. Additionally, it may be that the temperature required for drying the pressed article is higher than need be the case and/or the drying time may be longer than need be the case. At least in some instances, known press stations may not be able to produce the required shape of an article accurately enough (e.g. a 1° or 2° angle on a product 100 millimeters deep). Furthermore, the actual finish on every surface of the article may not be suitably consistent (e.g. the inside surface of an egg box formed from paper pulp is usually irregular and not as aesthetically pleasing as the exterior).

It is believed that known forming production methods for articles made from paper or fibre may not provide an article which is of a similar quality to that which can be produced from plastics or polystyrene (at least in some respects) and this tends to adversely affect the marketability of articles formed from paper/fibre.

SUMMARY OF THE INVENTION

An object of the invention is to at least alleviate one of the aforementioned, or other, disadvantages associated with forming machines or press stations and/or to provide a forming machine (or press station) which is improved in at least some respect.

According to the invention there is provided a forming machine for forming articles from pulp or slurry, comprising a press station having upper and lower perforate dies mounted, in use, for relative reciprocatory movement towards and away from one another and each said die being housed, in use, in an associated one of a two part chamber, said chamber parts being arranged to seal together when moved towards one another, and means for evacuating the sealed chamber whereby a final part of relative movement of the dies towards one another is caused by the evacuation.

Further according to invention there is provided a press station for a forming machine for forming articles from a paper or fibre slurry, the press station including a chamber housing, in use, die means for forming an article and means to evacuate the chamber in order to press the article in the die means.

Further according to the invention there is provided a forming machine including at least one press station in accordance with the immediately preceding paragraph.

Still further according to the invention there is provided the combination of a forming machine in accordance with the immediately preceding paragraph and a relatively lightweight support frame (weight less than 7 tons and possibly not more than 2 tons and preferably 3 tons or less or 6 tons or less).

Still further according to the invention there is provided a method of forming an article by pressing the article in die means, said method comprising evacuating a chamber surrounding the die means to provide sufficient pressure to press the article.

Still further according to the invention there is provided an article when made by the method according to the immediately preceding paragraph.

According to the applicant, advantageously, the required press loading force may be attained relatively easily in accordance with embodiments of the invention, thus substantially obviating the need for a hydraulic pressure ram, and most significantly, enabling a relatively lightweight and much less costly frame to be used instead of a massive framework. In embodiments of the present invention the cost of the framework could be reduced by, for example, 40% or so. The saving in weight may be greater than 70% and preferably is greater than 40% or 50%.

In the press station, the die means may comprise an upper perforate die or die set co-operable with a lower perforate die or die set in order to press form an article from paper pulp when said dies/die sets are brought together. The dies/die sets will usually be relatively reciprocable towards and away from one another. It is possible that only the upper die/die set is movable.

The chamber evacuation means preferably comprises a vacuum pump and the degree of vacuum control applied is preferably variable, for example, by means of a vacuum valve (variable orifice valve). Additionally or alternatively, a vent valve may be provided to ambient (atmospheric) conditions surrounding the chamber.

The chamber is, preferably, in two main parts or halves that can seal together in use and, preferably, one or each main part/half has a slidably mounted external skirt (preferably a flanged skirt) and of said skirts may be provided with a seal co-operable with the opposing skirt to form a sealing effect when the chamber parts/halves are closed together. Stops may be provided to limit the retraction and/or extension movement of the skirt relative to the associated chamber part/half. Alternatively, one chamber part/half may be slightly larger than the other and be slidably and sealably engageable with the other. Preferably, at least one of said main parts or halves of the chamber is float mounted on a member for moving said chamber part/half towards and away from the opposing chamber part/half.

The forming machine may include a forming station associated with or serving a plurality of press stations.

Still further according to the invention there is provided an article (e.g. an eggbox) press formed from a paper or fibre slurry said article being smooth on all surfaces.

Still further according to the present invention there is provided a press station for a forming machine for forming articles from a paper or fibre slurry, the press station comprising one or more of the following features:

a) evacuation means to evacuate a chamber surrounding press dies in order to provide a pressing force;
b) a press die mounted on a floating head;
c) two chamber parts or halves, one or each having a slidably mounted skirt;
d) evacuation means as in a), said means being variable to vary the degree of vacuum in the chamber;
e) means for pressing an article with smooth surfaces in a controlled way.

Many advantageous features of the invention will be apparent from the following description and drawings.

BRIEF DESCRIPTION OF THE DRAWINGS

Embodiments of the invention will now be described, by way of example only, with reference to the accompanying simplified diagrammatic drawings in which.

DETAILED DESCRIPTION OF THE INVENTION

Figure 1:
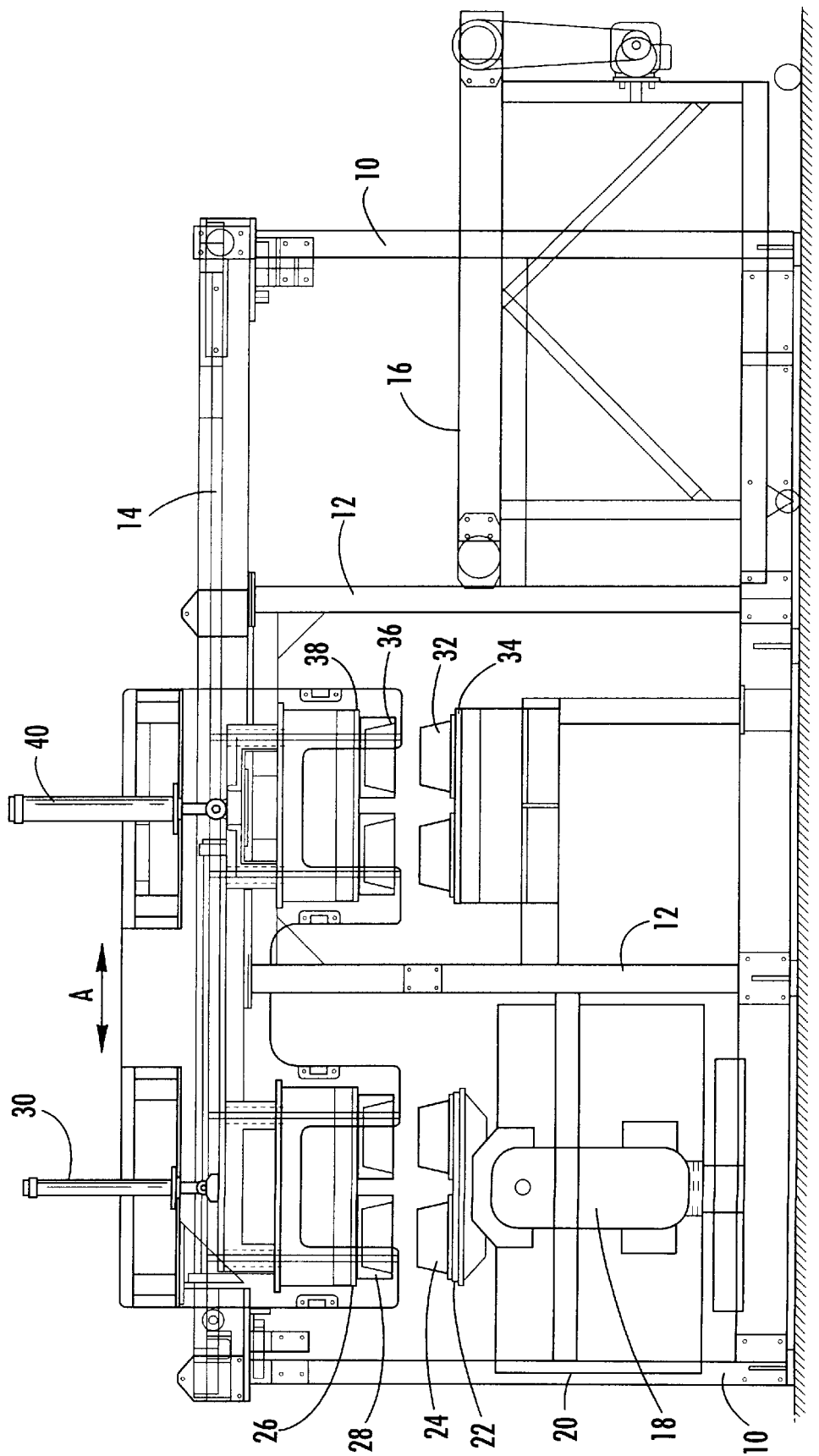
FIG. 1 shows a known forming machine.

FIG. 1 shows schematically a prior art forming machine supported by a relatively massive frame and aspects of the machine salient to the invention are now discussed.

In FIG. 1, the known forming machine comprises a relatively massive surrounding frame only diagrammatically shown as including uprights 10,12 and cross-members 14. In use, the uprights 10,12 are fixed to the ground.

The forming machine has a first station generally indicated by the reference (Forming), a second station (Press) and a third station (Conveyor) which is the loading end of a conveyor indicated by the reference numeral 16.

In the forming station a tank 20 contains paper slurry. A first platen 22 carries a moulding tool 24 which may be a male die and this is arranged with a motorised drive 18 for lowering the whole platen and tool into the tank 20. The drive 18 may be a hydraulic or pneumatic ram, or an electric motor, for example driving a rack and pinion or a toothed belt drive system for lowering the platen 22 and tool 24 into the tank 20 and subsequent raising out of the tank. The platen 22 is associated with vacuum means (for removal of steam or water vapour or the like and/or for adhering pulp to the platen by "suction" or releasing the pulp from the platen by blowing) and the tools are suitably perforate, so that water may be drawn through the tool 24, depositing pulp on its surface. Water continues to be drawn from the pulp when the platen 22 has been elevated out of the tank 20.

In vertical alignment with the platen 22 and tool 24 is a second platen 26 and tool 28 which may be a female die. It will be appreciated that the dies 24, 28 are matched, usually so as to produce a component (moulding) of substantially constant thickness at all points between the dies. Platen 26 and tool 28 are mounted on a lifting and lowering mechanism here illustrated as hydraulic ram 30. The hydraulic ram 30 could be replaced by pneumatic means.

As will be appreciated by those skilled in the art, the platens 22, 26 may carry a plurality of tool sets for use in manufacturing a plurality of identical (or different) articles in a single operation.

At a stage after the lower platen 22 and tool 24 have been elevated, the upper platen 26 and tool 28 are lowered into contact with the wet pulp formed on the lower tool. At this stage, the pulp is very fragile and its thickness is greater than the desired finished thickness of the article.

The vacuum on the lower platen 22 is released and a slight positive pressure is applied via the perforations (not shown). Simultaneously, light vacuum is applied via the perforations (not shown) in the upper platen 26. This causes the fragile moulding to separate from the lower platen 22 and temporarily adhere to the upper platen 26, which platen 26 is then raised clear of the tool 24 on the lower platen. The lower platen 22 and tool 24 are then lowered into the tank 20 to begin a subsequent forming operation.

The upper platen 26 and tool 28 complete with the fragile moulding (not shown) are then transferred on to the press station and the moulding is lowered into contact with the die or tool 32 (generally similar to tool 24) carried on the lower platen 34 in the press station. The fragile moulding is then transferred from the upper tool 28 to the lower tool 32 e.g. by positive pressure applied to the upper die and negative pressure applied to the lower die and the tool 28 is then returned to the forming station to repeat the cycle for the next fragile moulding (not shown).

In the press station, when the tool 28 is removed, a second similar upper tool 36, carried by platen 38 of an upper press head is lowered into contact with the fragile moulding supported on lower tool 32. The tools 36,32 may be closed together more closely than tools 24,28 so as to squeeze the fragile moulding to a reduced thickness and initiate removal of further water. Each of the tool systems 32,36 on the respective platens 34, 38 may be associated with corresponding vacuum systems and additionally both are provided with heating means (usually electrical); as is the platen 26, which causes the production of steam which is also withdrawn through the vacuum systems. The removal of steam dries the pulp and hardens the moulding, and the dried and finished moulding may be carried by the tool 36 and deposited on the conveyor 16. This latter transfer of the moulding is effected by releasing the moulding from the lower tool 32 by air pressure and retaining the moulding on the upper tool 36 by vacuum.

The press operation requires a very considerable force, depending upon the required degree of compression of the pulp and upon the total area of the respective platens and the number of components (mouldings) which are being manufactured. A force equivalent to a number of tons (e.g. over 20 tons) may be required and this necessitates a substantial and relatively massive frame to withstand pressure applied by hydraulic ram 40 carrying the upper press head of tool 36 and platen 38, and in particular to repeatedly withstand or absorb the reaction force during the pressing step.

The complete assembly of hydraulic cylinders 30, 40 (cylinder 30 may be pneumatic) with the two upper platens 26, and tools is reciprocated generally in the directions of the letter A in transferring mouldings from one station to the next and to the conveyor, possibly on a beam carried by the structural framework. The pressure to be exerted at the forming station on the paper slurry in forming the article is not high in relation to the 20 tons pressure required at the press station and thus the massive framework 10,12,14 is not necessitated by the forming station.

The invention is concerned with a modification to the press station of the aforedescribed known type of forming machine, which modification may alleviate the need for the hydraulic ram of the press station or at least the high specification of same and/or alleviate the need for a relatively massive framework 10,12.

Figure 2:
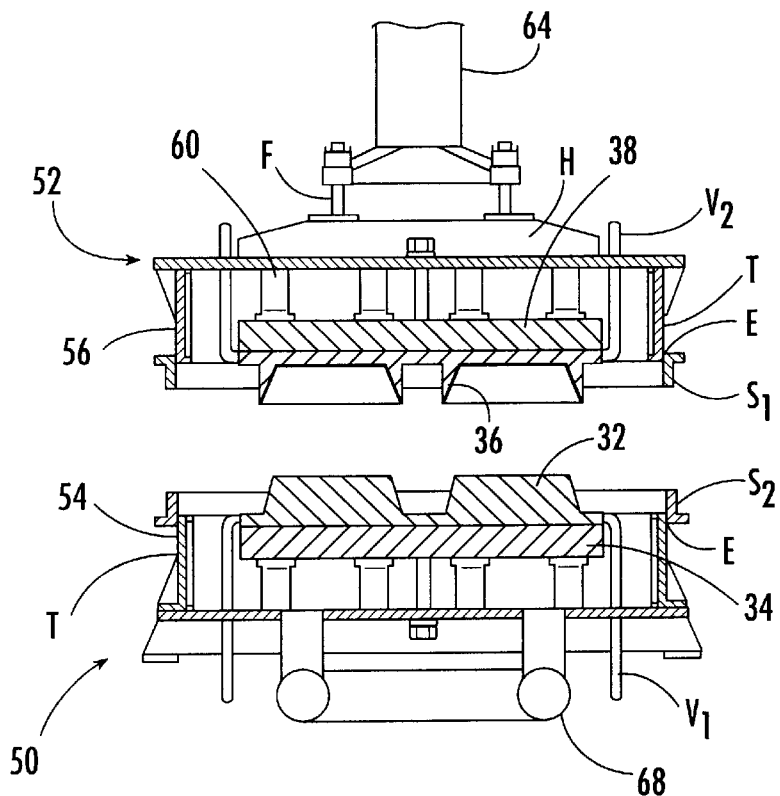
FIG. 2 shows a sectional view of a first embodiment of a press station of a forming machine in accordance with the invention, with dies separated.
Figure 3:
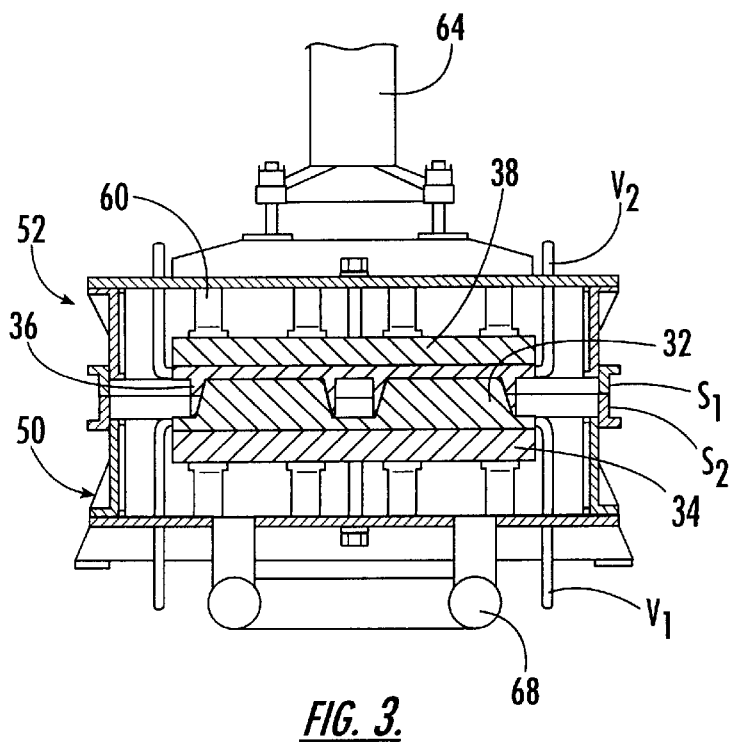
FIG. 3 shows substantially the same view as FIG. 2 with the dies closed together.
Figure 4:
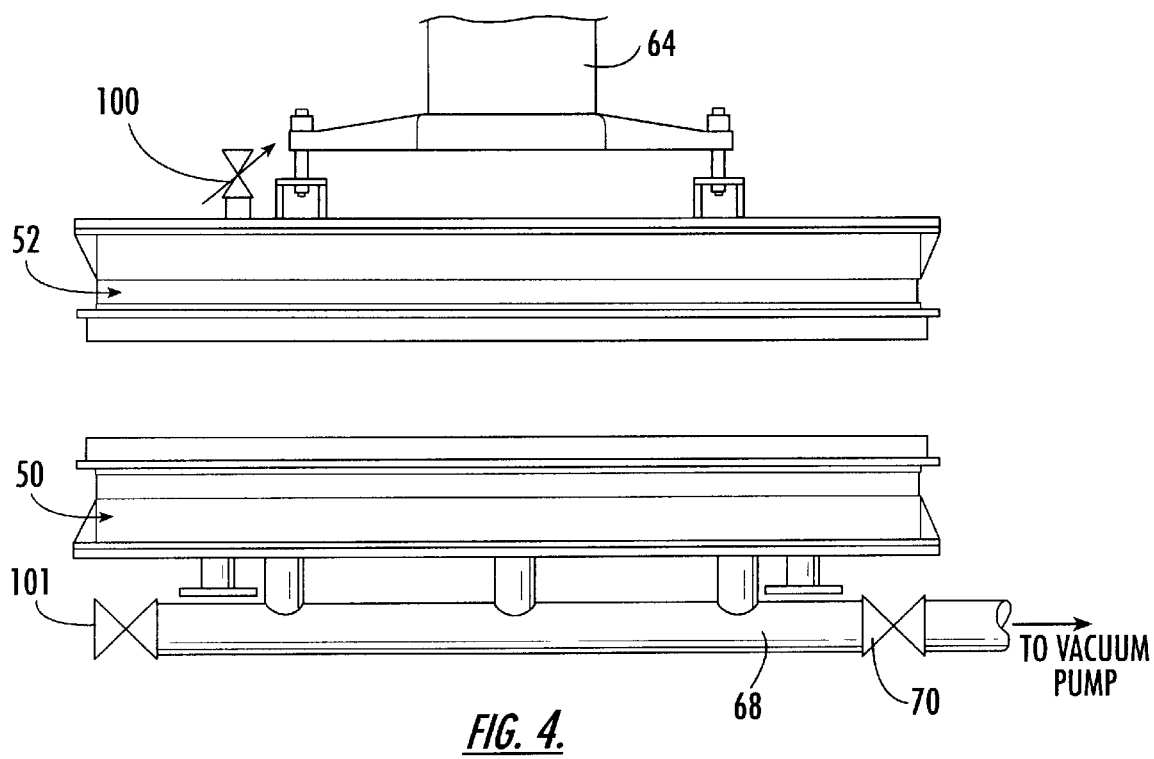
FIG. 4 shows an enlarged elevational view of two chamber parts of the press.
Figure 5:
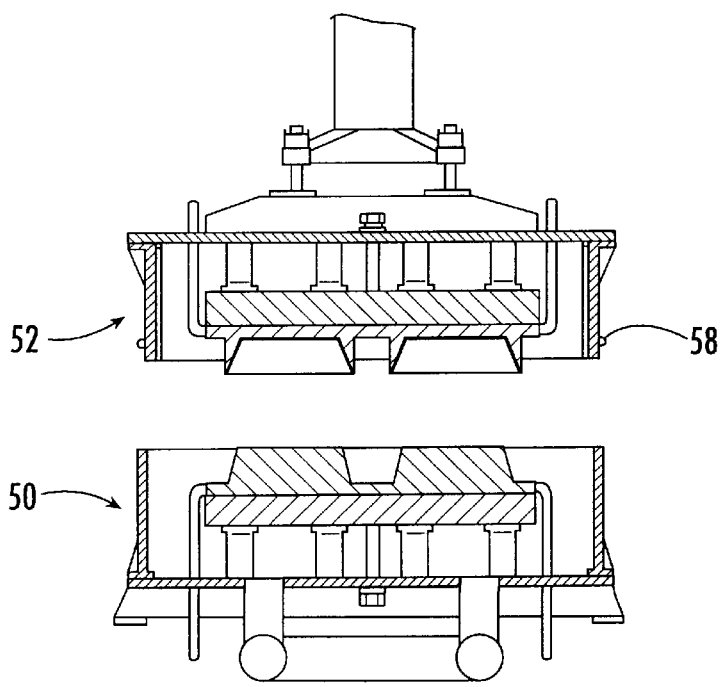
FIG. 5 shows a view of a further embodiment of a press station.

In the illustrated embodiment of the invention shown in FIGS. 2 to 4, a press station has a chamber comprising a lower part or half 50 and an upper part or half 52. The chamber 50,52 is provided as part of the press station (not shown in full in FIGS. 2 to 4) of the forming machine. Each half 50, 52 may be, for example, substantially rectangular with a peripheral wall 54,56 and the upper half may be dimensioned so as to be a free sliding fit in the lower half when the two move together more particularly as shown in our prior patent specification No. 9722547.8 forming the priority document for this application and as shown in FIG. 5. The word "half" is used in a merely indicative sense; the two halves could be of widely different volume, although in the embodiment shown in FIGS. 2, 3 and 4 the two "halves" are very similar in shape and size. As shown in patent specification No.9722547.8 and as shown in the embodiment of FIG. 5, sealing may be effected by an O-ring or the like 58 extending around the periphery of the external face of the smaller of the two halves 50, 52 so as to seal on the inner face of the skirt of the larger of the halves. Alternatively, a highly resilient face seal could be used between the two halves. As shown in FIGS. 2 and 3 of this specification a preferred modification has been made to the chamber halves 50, 52 which includes a spring loaded sliding flanged skirt $S_1$, $S_2$ being provided on the external wall 54, 56 of each chamber half respectively. A sliding seal E is provided on each chamber half 50, 52 which allows vertical reciprocation of the skirt $S_1$, $S_2$ relative to the external wall 54, 56 within fixed limits. A stop T is provided in the form of a projecting annular edge on each external wall 54, 56 to limit the retraction movement of each skirt $S_1$, $S_2$ relative to the external walls 54, 56 in a manner which should be evident from FIG. 2. If desired, in an alternative embodiment only one skirt (e.g. upper skirt $S_1$) is slidable, the other skirt (e.g. $S_2$) being fixed.

Each of the chamber halves 50, 52 in FIG. 2 carries a platen and dies which are generally the same as those shown in the press station in FIG. 1 and thus bear the same reference numbers 32, 34, 36, 38. However, instead of mounting the upper platen 38 on the ram of a hydraulic cylinder for pressurisation, which is the arrangement in FIG. 1, in FIG. 2 and FIG. 3 the upper platen 38 is carried on stand-off pins 60. It will be appreciated that the perforate dies 32, 36 communicate with passages which in this case may extend through the platen 34, 38 to the interior of the half chamber 50, 52 as well as being ducted away by a secondary vacuum system $V_1$, $V_2$. The secondary vacuum system $V_1$, $V_2$ is for transfer of the moulded article and steam extraction which is the case in the arrangement shown in FIG. 1.

The upper chamber 52 half is shown float mounted on a member 64 extending vertically, which member may be reciprocated by an electric motor, for example, so as to carry it between a remote position and a position in which the chamber halves 50, 52 are engaged sufficiently for the sliding skirts $S_1$, $S_2$ to engage with the seal mounted in the upper annular edge of skirt $S_2$ engaging the lower annular edge of skirt $S_1$. Instead of providing a hydraulic ram to complete the stroke and apply the required pressure, a vacuum pump is connected through manifold 68 and main vacuum valve 70 (see FIG. 4) to the interior of the chamber so that once the seal is engaged, the chamber 50, 52 can be evacuated. Evacuation of the chamber 50, 52 not only draws water from the formed moulding but also draws the chamber halves together to close the dies 32, 36 about the moulding finally, preferably, to a point at which peripheral abutment faces on the dies come into contact so as to prevent further movement.

Lowering the pressure within the enclosure (chamber 50, 52) surrounding the press-heads (platens and dies 32, 34, 36, 38) also reduces the temperature at which water in the pulp evaporates, thereby requiring lower temperatures of the heated platens and/or reduced times for the drying operation.

One or other or both of the platens 34,38 will be heated in a similar fashion as in the FIG. 1 arrangement.

According to a further feature of the invention, a single forming station generally as shown in FIG. 1 may be associated with a plurality of press stations as shown in FIG. 2 and FIG. 3. The significance of this further feature is that the required water extraction and drying operation requires a substantially longer time than the forming operation carried out in the first stage as in the FIG. 1 apparatus, and for increased speed of production the press operation can be carried out in two or more stages. Hence, each horizontal reciprocation in the direction of the arrow A will transfer during a first half of the reciprocation (to the right in FIG. 1) a formed wet moulding from the forming station to a first press operation stage, and transfer a pressed and part dried moulding from the first press stage onto a second press stage and so on according to the number of press stations provided, whilst the second half of each reciprocation (movement to the left in FIG. 1) returns the tools 28, 36 to the initial position so that a further cycle can commence.

It will be appreciated by those skilled in the art that in the formation and handling of components made from wet paper slurry the mouldings are of varying degrees of fragility at all times during the process. The strength of the mouldings increases as the compression and drying continue from stage to stage but the pressures applied, particularly when a positive air pressure is provided to blow a moulding off one die on to another, must be controlled within fine limits. According to the applicant, the atmospheric pressure which is possible upon a relatively large area chamber when the vacuum is applied may be excessive and could possibly lead to an undesirably high pressure being applied to the mouldings unless limited by abutments on the dies. Therefore, according to a feature of the invention, means is provided for limiting the degree of vacuum in the sealed chamber or chambers (where more than one press station is provided) and possibly for continuously admitting ambient air under volume/pressure control (and this may sweep the chamber/s to evacuate all steam and water when both air is applied and vacuum applied at one and the same time). This feature may accelerate the operation in each press stage leading to a higher throughput from any one machine. To this end FIG. 4, showing an enlarged view of the chamber 50, 52 shown in FIG. 2, includes a variable orifice vacuum control valve 100 extending from the upper half 52 to limit the degree of vacuum in the sealed chamber.

Additionally, an atmospheric vent valve 101 is shown in order to continuously admit ambient air when required.

A further very important feature of the invention is the provision of the guided, resilient floating mounting F of the head or unit H in carrying the upper platen 38, die 36 and chamber half 52.

It is to be understood that the scope of the invention is not to be unduly limited by the particular choice of terminology and that a specific term may be replaced by any equivalent or generic term. For example, the term "machine" could be replaced by "apparatus" or "article" could be replaced by "product".

Further it is to be understood that individual features, method or functions relating to the forming machine or press station or evacuation arrangement might be individually patentable. In particular, any disclosure in this specification of a range for a variable or parameter shall be taken to include a disclosure of any selectable or derivable sub-range within that range and shall be taken to include a disclosure of any value for the variable or parameter arranged within or at an end of the range. The singular may include the plural or vice versa.

What is claimed is:

1. A press station for forming an article from a paper or fiber slurry, comprising:

a chamber housing defining a pair of sides, said sides being in fluid communication with each other;

first and second co-operable dies adapted to receive the slurry therebetween, said dies being mounted on a respective side of said chamber housing and arranged so that said sides of said chamber housing remain in fluid communication even when a slurry is received between said first and second dies; and means for evacuating said chamber housing so that said sides of said chamber housing are moved together by way of said fluid communication and said first and second dies are urged together to thereby press the slurry between said dies and form the article.

2. A press station as defined in claim 1 wherein said evacuating means comprises a vacuum pump.

3. A press station as defined in claim 2 wherein said vacuum pump comprises a variable orifice valve to control the vacuum within said chamber housing.

4. A press station as defined in claim 2 wherein said chamber housing comprises a vent valve to control the vacuum within said chamber housing.

5. A press station as defined in claim 1 wherein said chamber housing sides comprise first and second halves, said first half corresponding to said first die, said second half corresponding to said second die, said first and second halves being adapted to sealably engage each other.

6. A press station as defined in claim 5 wherein said first and second halves of said chamber housing each comprise a slidably mounted skirt, each of said skirts having a seal co-operable with the other of said skirts to thereby seal said chamber housing.

7. A press station as defined in claim 5 wherein one of said first and second halves of said chamber housing is larger than the other of said halves so that said first and second halves are slidably and sealably engageable.

8. A press station as defined in claim 5 wherein said first half of said chamber housing is float mounted on a member for moving said first half towards and away from said second half of said chamber housing.

9. An apparatus for forming an article from a paper or fiber slurry, comprising:

a forming station; and
   at least one press station, comprising:
      a chamber housing defining a pair of sides, said sides being in fluid communication with each other;
      first and second co-operable dies adapted to receive the slurry therebetween, said dies being mounted on a respective side of said chamber housing and arranged so that said sides of said chamber housing remain in fluid communication even when a slurry is received between said first and second dies; and
      means for evacuating said chamber housing so that said sides of said chamber housing are moved together by way of said fluid communication and said first and second dies are urged together to thereby press the slurry between said dies and form the article.

10. An apparatus as defined in claim 9 wherein said evacuating means comprises a vacuum pump.

11. An apparatus as defined in claim 10 wherein said vacuum pump comprises a variable orifice valve to control the vacuum within said chamber housing.

12. An apparatus as defined in claim 10 wherein said chamber housing comprises a vent valve to control the vacuum within said chamber housing.

13. An apparatus as defined in claim 9 wherein said chamber housing sides comprise first and second halves, said first half corresponding to said first die, said second half corresponding to said second die, said first and second halves being adapted to sealably engage each other.

14. An apparatus as defined in claim 13 wherein said first and second halves of said chamber housing each comprise a slidably mounted skirt, each of said skirts having a seal co-operable with the other of said skirts to thereby seal said chamber housing.

15. An apparatus as defined in claim 13 wherein one of said first and second halves of said chamber housing is larger than the other of said halves so that said first and second halves are slidably and sealably engageable.

16. An apparatus as defined in claim 13 wherein said first half of said chamber housing is float mounted on a member for moving said first half towards and away from said second half of said chamber housing.

17. A method of forming an article from a paper or fiber slurry, comprising:

positioning a layer of slurry between first and second dies; and
   evacuating a chamber housing so that the sides of the chamber housing are moved together by way of fluid communication between the sides and the first and second dies are urged together to thereby press the slurry between the dies and form the article.

18. A method of forming an article as defined in claim 17 further comprising withdrawing water from the slurry through perforations in the first and second dies.

19. A method of forming an article as defined in claim 17 further comprising venting the chamber housing to the ambient pressure surrounding the chamber housing.

20. A method of forming an article as defined in claim 17 further comprising:

moving a first chamber half adjacent a second chamber half after said positioning step to form the chamber housing; and
   retracting a slidably mounted skirt on at least one of the first and second chamber halves to seal the chamber housing.

21. A method of forming an article as defined in claim 17 further comprising inserting a first chamber half telescopically into a second chamber half to form a sealed chamber housing.

* * * * *